US009554352B1

(12) United States Patent
Jiacinto et al.

(10) Patent No.: US 9,554,352 B1
(45) Date of Patent: Jan. 24, 2017

(54) MULTI-CHANNEL MESH ENHANCED MOBILE RADIO HANDSET

(75) Inventors: Joseph F. Jiacinto, Mount Vernon, IA (US); David A. Gribble, Cedar Rapids, IA (US); Michael N. Newhouse, Cedar Rapids, IA (US); Scott J. F. Zogg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1276 days.

(21) Appl. No.: 11/800,132

(22) Filed: May 4, 2007

(51) Int. Cl.
*H04W 24/00* (2009.01)
*H04B 7/00* (2006.01)
*H04W 4/00* (2009.01)
*H04W 64/00* (2009.01)
*H04W 84/18* (2009.01)
*H04W 4/02* (2009.01)

(52) U.S. Cl.
CPC ............ *H04W 64/00* (2013.01); *H04W 84/18* (2013.01); *H04W 4/023* (2013.01)

(58) Field of Classification Search
CPC ............................... H04W 64/00; H04W 84/18
USPC ............ 370/338, 401, 351; 455/456.1, 456.6
See application file for complete search history.

(56) References Cited

U.S. PATENT DOCUMENTS

| 6,611,231 | B2 | 8/2003 | Crilly, Jr. et al. | |
|---|---|---|---|---|
| 6,970,682 | B2 | 11/2005 | Crilly, Jr. et al. | |
| 7,006,453 | B1* | 2/2006 | Ahmed et al. | 370/255 |
| 7,205,933 | B1 | 4/2007 | Snodgrass | |
| 2004/0152420 | A1* | 8/2004 | Redi | H04W 52/10 455/67.11 |
| 2005/0114551 | A1* | 5/2005 | Basu et al. | 709/249 |
| 2005/0250468 | A1* | 11/2005 | Lu et al. | 455/403 |
| 2006/0104230 | A1* | 5/2006 | Gidwani | 370/328 |
| 2006/0153157 | A1* | 7/2006 | Roh | H04L 45/00 370/338 |
| 2006/0293024 | A1* | 12/2006 | Benco | H04M 7/006 455/404.2 |
| 2007/0053295 | A1* | 3/2007 | Cleveland | H04L 45/121 370/235 |
| 2008/0159207 | A1* | 7/2008 | Levine | H04W 16/14 370/329 |

FOREIGN PATENT DOCUMENTS

WO WO 2005/083953 9/2005

* cited by examiner

*Primary Examiner* — Dung Hong
(74) *Attorney, Agent, or Firm* — Angel N. Gerdzhikov; Donna P. Suchy; Daniel M. Barbieri

(57) ABSTRACT

A mobile radio has more than one channel, each channel corresponding to a programmable transceiver circuit. The mobile radio also includes at least one high gain antenna coupled to at least one of the programmable transceiver circuits. A location determining circuit is configured to determine the location of the mobile radio. A processor is coupled to the transceivers and to the location determining circuit. The processor runs a program logic that is configured to identify whether the mobile radio is in a location that enables the mobile radio to extend the reach of the network both due to its location and due to the use of the at least one high gain antenna. The processor also runs a program logic to carry out spectrum sensing to identify available spectral resources based on communication traffic on various frequency bands.

5 Claims, 4 Drawing Sheets

MULTI-CHANNEL MESH ENHANCED MOBILE RADIO HANDSET

BACKGROUND

The invention generally relates to mesh networking. Mesh networking is a method of routing data, voice and instructions between radio nodes. This method allows for continuous connections and reconfiguration around broken or blocked paths by hopping from node to node until the destination is reached. Mesh networks have and are being used in military communication applications where the nodes of the network need to be reconfigured and are mobile. An advantage of using mesh networks particularly in military applications is that the mesh networks are self-healing. The network can still operate even when a node breaks down or a connection goes bad.

The Media Access Control (MAC) data communication protocol sub-layer is a part of the data link layer that provides addressing and channel access control mechanisms that make it possible for several terminals or network nodes to communicate within a multipoint network.

The MAC layer provides an addressing mechanism called physical address or MAC address. This is a unique serial number assigned to each network adapter, making it possible to deliver data packets to a destination within a subnetwork, i.e. a physical network without routers.

Media access control is often used as a synonym to multiple access protocol, since the MAC sublayer provides the protocol and control mechanisms that are required for a certain channel access method. This makes it possible for several stations connected to the same physical medium to share it.

Medium access control design and architecture plays a significant role in achieving data throughput and capability of networked radio systems. As radio hardware provides greater levels of reconfigurability through ongoing developments in software defined and cognitive radio research, MAC implementation in meshed network radios must be optimized to fully exploit key radio hardware adaptability features and unique modes of operation to enable fully meshed networking paradigms. On the physical layer protocol (PHY) side, RF hardware must provide certain performance degrees of freedom and support specific channel reconfigurability modes to fully enable meshed networking. Current radio hardware lacks the high degree of reconfigurability to fully support meshed networking paradigms, moreover, standard commercial off-the-shelf (COTS) MAC protocols lack the flexibility to take advantage of radio and system adaptability features.

Accordingly, there is a need for a radio architecture that is able to support meshed networking with a high degree of reconfigurability. Further, there is a need for a radio handset that can be used and applied in a meshed networking environment where a high degree of reconfigurability exists.

The techniques herein below extend to those embodiments which fall within the scope of the appended claims, regardless of whether they accomplish one or more of the above-mentioned needs.

SUMMARY

What is provided is a mobile radio that has more than one channel, each channel corresponding to a programmable transceiver circuit. The mobile radio also includes at least one high gain antenna coupled to at least one of the programmable transceiver circuits. A location determining circuit is configured to determine the location of the mobile radio. A processor is coupled to the transceivers and to the location determining circuit. The processor runs a program logic that is configured to identify whether the mobile radio is in a location that enables the mobile radio to extend the reach of the network both due to its location and due to the use of the at least one high gain antenna. The processor also runs program logic to carry out spectrum sensing to identify available spectral resources based on communication traffic on various frequency bands.

What is also provided is a method of using a mobile radio in a mesh radio network. The method includes determining a location of the mobile radio. The method also includes determining the available spectral resources based on the output of a spectrum sensing logic. Further, the method includes determining whether a high gain antenna of the mobile radio may be used to extend the reach of the mesh network based in part on the location of the mobile radio and sending and/or receiving information from another mobile radio in the mesh network using at least one of more than one programmable transceiver circuit.

Further, what is provided is a mesh radio network. The mesh radio network comprises more than one mobile radio. At least one of the mobile radios includes more than one channel, each channel corresponding to a programmable transceiver circuit. The mobile radios may also include a location determining circuit configured to determine the location of the mobile radio and a processor coupled to the transceivers and to the location determining circuit. The processor is running program logic that is configured to identify whether the mobile radio is in a location that enables the mobile radio to extend the reach of the network both due to its location, the processor also running program logic to carry out spectrum sensing to identify available spectral resources based on communication traffic on various frequency bands. The more than one radios communicate over one or more of the channels.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
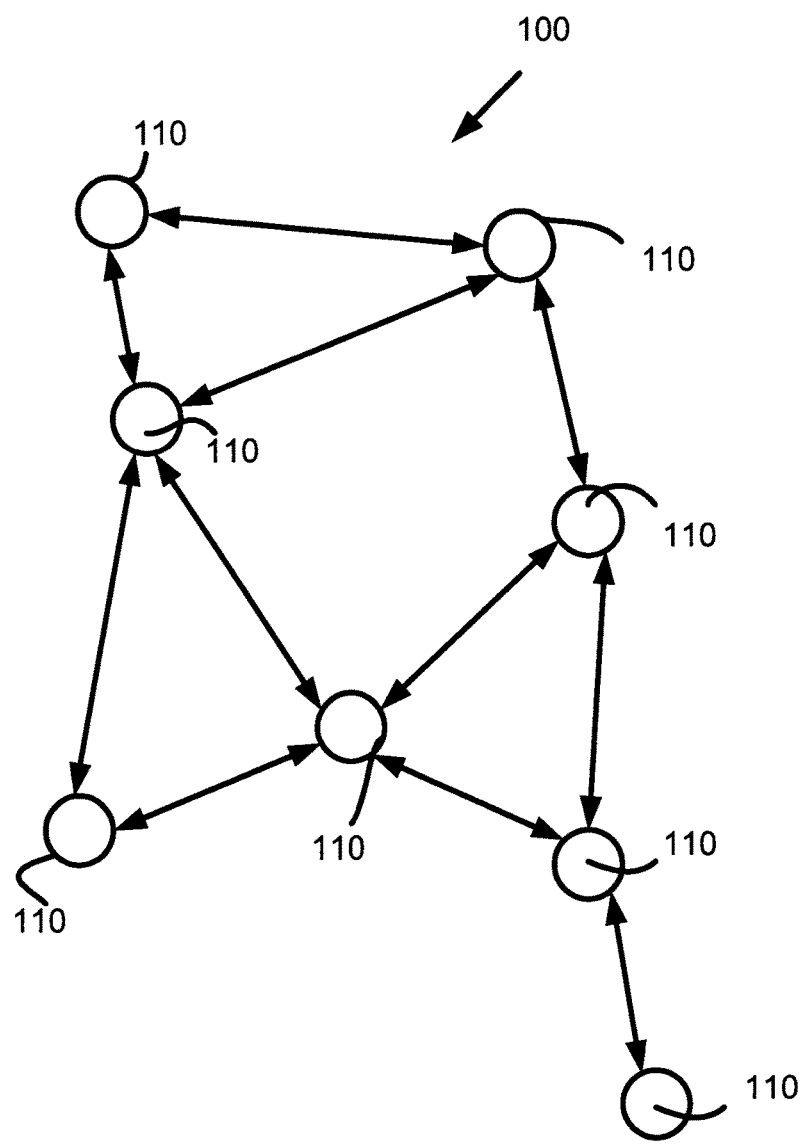
FIG. 1 is an exemplary depiction of a mesh network used by a plurality of mobile radio nodes.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, a mesh radio network 100 is depicted. Mesh radio network 100 may be any of a variety of communication networks including those that are used for military, commercial, or personal purposes. Such radio networks may include a plurality of mobile radio nodes 110 that may form a mesh network that is reconfigurable during use and are able to make use of available spectral resources for communication. Each radio node may be able to communicate directly with one or more mobile radios and communicate through the network to radios which are more than one hop away.

Figure 2:
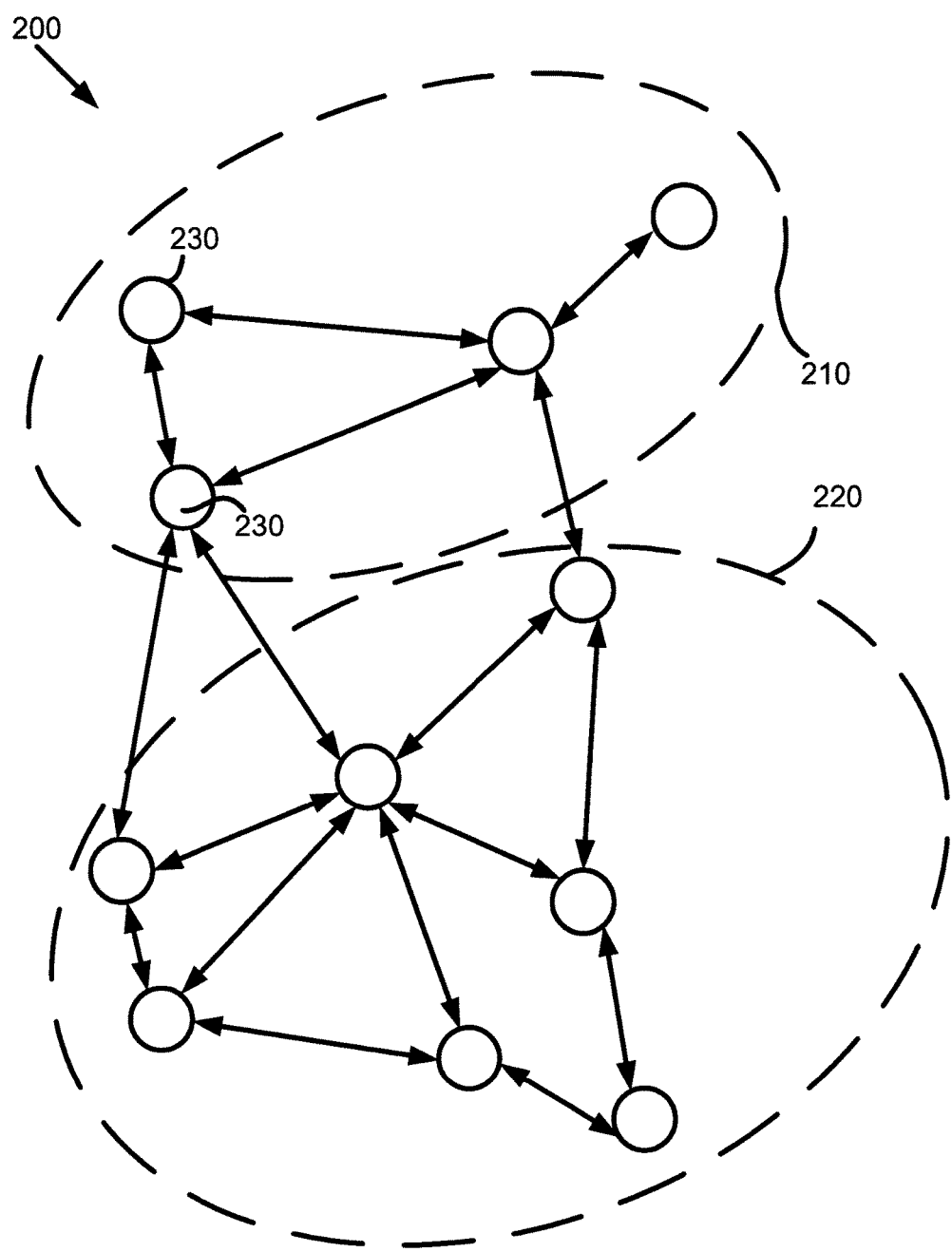
FIG. 2 is an exemplary diagram of a mesh network used by a plurality of mobile radio nodes and being divided into multiple sub networks.

Referring now to FIG. 2, mesh network 200 may include a plurality of mobile radio nodes 230 which are sub grouped into two, or in other situations more than two, sub networks 210 and 220. Each of the subnetworks may be used to aid in allocation of spectral resources as well there may be limited communication between the two networks because of distance, obstacles, etc., thus communication between the two sub networks may be done by only a few nodes whose responsibility may be to manage and carry out communication between the two sub networks.

Figure 3:
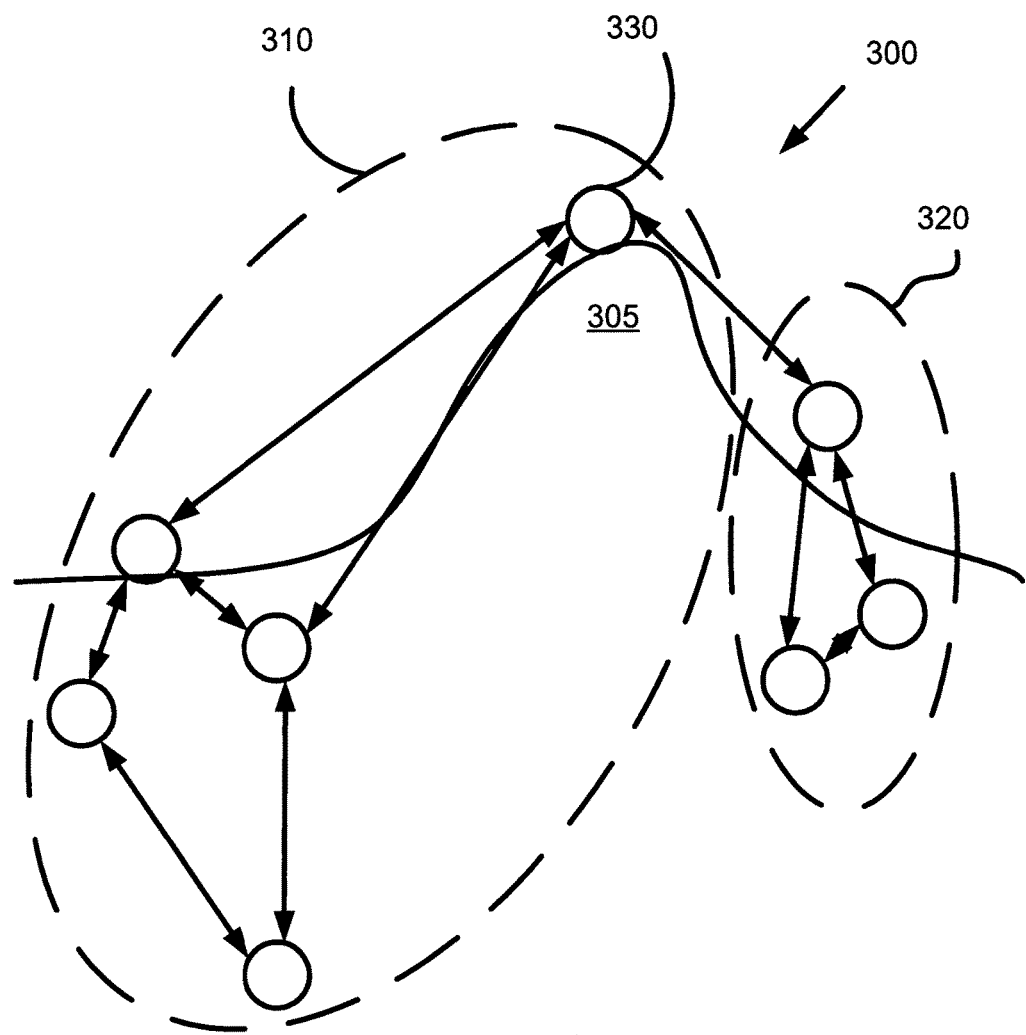
FIG. 3 is an exemplary diagram of a mesh network used by a plurality of mobile radio nodes and being divided into multiple sub networks and hindered by a terrain obstacle.

Referring now to FIG. 3, a network 300 is depicted where two subnetworks 310 and 320 exist, each on different sides of an obstacle such as a mountain 305. The two networks 310 and 320 need to communicate with each other, but it may be difficult because of the obstacle, and/or because of the distance. In one exemplary embodiment, the radio nodes recognize the location of each node. Based on the location it is determined that node 330 may be in line of sight of one or more nodes in subnetwork 320. Thus, the network determines that node 330 is an advantaged node and may be able to communicate with subnetwork 320. Often, however subnetworks may become disconnected because of range limitations. In accordance with an exemplary embodiment radio nodes may be equipped with one or more high gain antennas to transmit over large distances. The advantaged node may take advantage of the high gain antenna and stream traffic over a corresponding channel to reach subnetwork 320. The use of at least one high gain antenna coupled with multiple wideband apertures on other channels provides the ability for large throughput while being able to extend the range of the mesh network and subnetworks.

Figure 4:
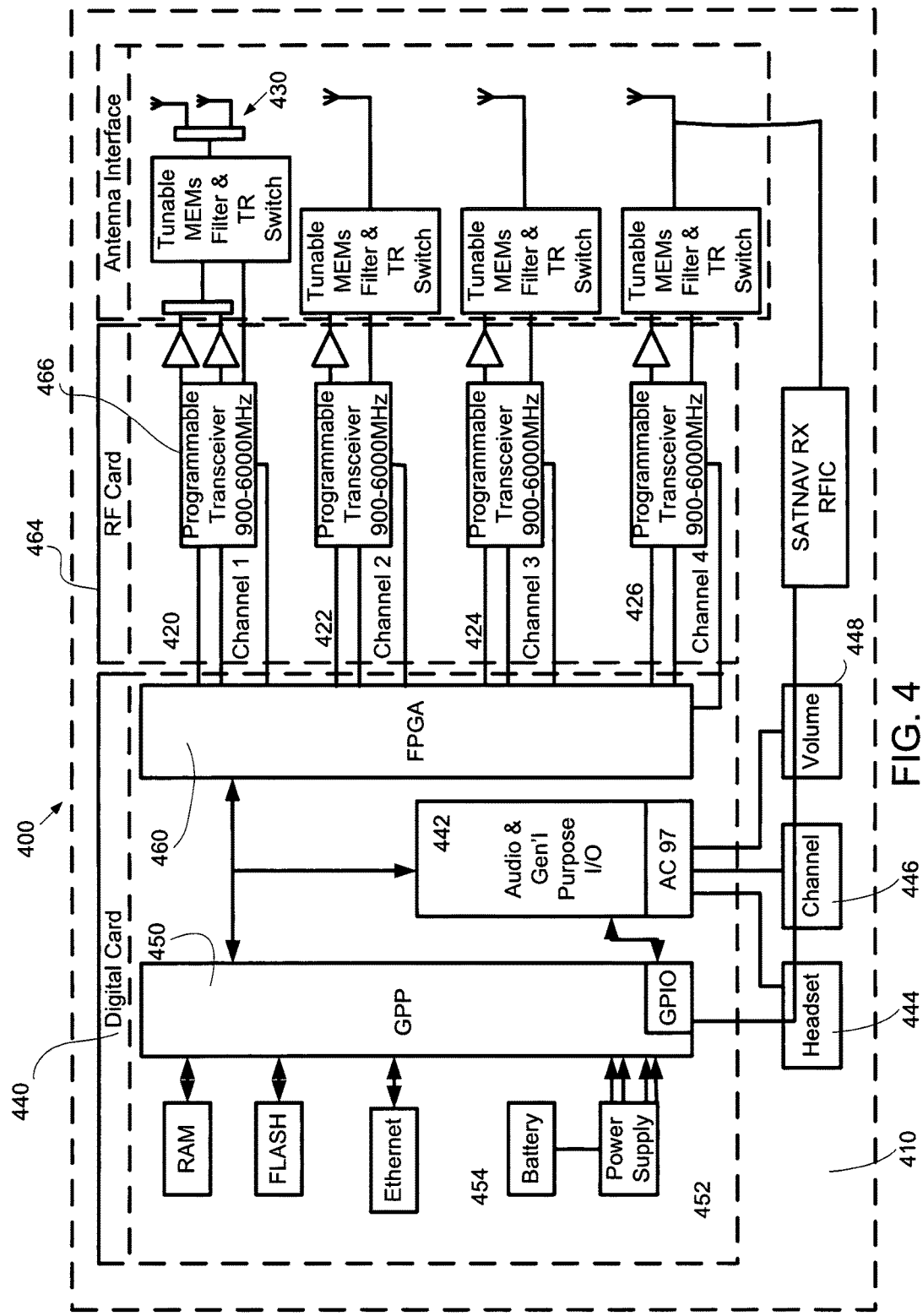
FIG. 4 is an exemplary diagram of a radio architecture.

Referring now to FIG. 4, a novel radio architecture 400 is depicted that features a flexible MAC layer 410. The flexible MAC layer 410 is conceived to support meshed networking that is combined with highly adaptable, frequency agile radio hardware and satellite geolocation to support high-data throughput through multiple moderate performance radio nodes. Such radios may include, but are not limited to the following features:

4 identical wide-band channel, ½ duplex, 400 MHz-6,000 MHz 420, 422, 424, and 426

1 of the 4 channels can be coupled to a high gain antenna 430 with greater transmit power over a subset of the frequency band with better propagation characteristics to extend the transmission/reception range of distant nodes in the network Satellite geolocation is included to provide greater situational awareness, as an example, altitude information will be used to identify "advantaged" nodes that would have better line-of-sight propagation and extend the range of the radio network. Satellite geolocation could also provide a means to time synchronize radios in the network Spectrum sensing matched to the channel-spectrum sensing is time shared across channels of the radio, a radio node could be configured with all 4 channels sensing or no channels sensing, to provide the network with varying degrees of spectral sensing resources to identify open channels or potential interferers.

Multiple bandwidths and waveforms-ability to exploit both wide and narrow channels opportunities.

Flexible MAC protocol designed to fully exploit radio adaptability to maximize data throughput.

Radio 400 also may include a digital card 440. Digital card 440 may include an interface 442 for general purpose input/output functions as well as for audio input/output functions. Interface 442 may be coupled to, for example, a headset 444, a channel selector and/or channel display 446, and a volume control 448, etc. Digital card 440 may also include a general purpose processor 450 or other type of processor. Such a processor 450 is conventionally coupled to a power supply 452 having a battery 454. GPP 450 may also be coupled to any of a variety of memory or storage devices including but not limited to random access memory (RAM) 456, and flash memory 458, etc. A mesh network interface card (MeshNIC) 460 may be a field programmable gate array as well as other types of processors.

In accordance with an exemplary embodiment, radio 400 may also include a radio frequency (RF) card 464 having multiple channels 420, 422, 424, and 426. Each channel may include a soft transceiver 466. Each transceiver may operate over various frequency ranges, for example 900-6000 MHz, 400-6000 MHz, or other ranges and subranges. In accordance with an exemplary embodiment, the multiple channels support multiple input multiple output (MIMO) modes of operation. These MIMO modes are made possible by the use of multiple transceivers and antennas and realized through processing power and software in FPGA (MeshNIC) 460. Due to demands to support the mesh network especially in use in a tactical operation, MIMO modes of operation are desirable for a mobile radio handset.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A method, comprising the steps of:
providing a first mobile radio with a first plurality of programmable transceiver circuits, disposed therein;
providing a high gain antenna coupled to a first one of the first plurality of programmable transceiver circuits, said high gain antenna configured to provide greater transmit power over a predetermined frequency subset of a frequency band common to each of said first plurality of programmable transceiver circuits;
providing a location determining circuit configured to determine the location of the first mobile radio;
within said first mobile radio, coupling a processor with the first plurality of programmable transceiver circuits and the location determining circuit, the processor running program logic that is configured to make an identification as to whether the first mobile radio is in a location that may enable the first mobile radio to extend the reach of a network of a plurality of radio nodes, where one of said plurality of radio nodes comprises said first mobile radio;
said processor further running program logic configured to make a designation of said first mobile radio as an advantaged radio node in response to said identification; and
establishing communication between said first mobile radio at said predetermined frequency subset, in response to said designation, where such communication extends the reach of the network by transmitting with said one of the plurality of programmable transceiver circuits and said high gain antenna.

2. The method of claim 1, wherein said processor is a general purpose processor and is indirectly electronically coupled to said plurality of programmable transceiver circuits.

3. The method of claim 1, wherein the high gain antenna is coupled indirectly to said first one of the plurality of programmable transceiver circuits.

4. The method of claim 1, wherein the high gain antenna is coupled only to said first one of the plurality of programmable transceiver circuits.

5. The method of claim 1, wherein the location determining device comprises:
a satellite geolocation signal receiver.

* * * * *